US009242231B2

(12) United States Patent
Tenne et al.

(10) Patent No.: US 9,242,231 B2
(45) Date of Patent: Jan. 26, 2016

(54) METAL NANOPARTICLE DEPOSITED INORGANIC NANOSTRUCTURE HYBRIDS, USES THEREOF AND PROCESSES FOR THEIR PREPARATION

(71) Applicants: Yeda Research and Development Co. Ltd., Rehovot (IL); NDSU Research Foundation, Fargo, ND (US)

(72) Inventors: Reshef Tenne, Rehovot (IL); Yulia Tsverin, Rehovot (IL); Uwe Burghaus, Fargo, ND (US); Mallikharjuna Rao Komarneni, Fargo, ND (US)

(73) Assignees: YEDA RESEARCH AND DEVELOPMENT CO., LTD., Rehovot (IL); NDSU RESEARCH FOUNDATION, Fargo, ND (US)

( * ) Notice: Subject to any disclaimer, the term of this patent is extended or adjusted under 35 U.S.C. 154(b) by 177 days.

(21) Appl. No.: 13/855,258

(22) Filed: Apr. 2, 2013

(65) Prior Publication Data
US 2014/0005040 A1    Jan. 2, 2014

Related U.S. Application Data

(60) Provisional application No. 61/619,080, filed on Apr. 2, 2012.

(51) Int. Cl.
*B01J 27/049*    (2006.01)
*B01J 27/02*    (2006.01)
(Continued)

(52) U.S. Cl.
CPC ........... *B01J 27/049* (2013.01); *B01D 53/8687* (2013.01); *B01J 27/02* (2013.01); *B01J 35/004* (2013.01); *B01J 35/006* (2013.01); *B01J 35/0013* (2013.01); *B01J 35/06* (2013.01); *C10G 45/04* (2013.01); *B01D 2255/20776* (2013.01); *B01D 2255/802* (2013.01); *B01D 2257/70* (2013.01); *B01J 37/0217* (2013.01);
(Continued)

(58) Field of Classification Search
CPC ............ B01J 23/00; B01J 23/16; B01J 23/22; B01J 23/26; B01J 23/34; B01J 23/40; B01J 23/50; B01J 23/64; B01J 27/02; B01J 27/045; B01J 27/047; B01J 27/051; B01J 27/057; B01J 35/004
USPC .......... 502/216, 219–222, 312; 204/109, 114, 204/122, 157, 255
See application file for complete search history.

(56) References Cited

U.S. PATENT DOCUMENTS 3,769,210 A  * 10/1973 Cais et al. ..................... 508/166
4,822,590 A  *  4/1989 Morrison et al. ........... 423/561.1
(Continued)

OTHER PUBLICATIONS

"Wear and Friction of Ni—P Electroless Composite Coating Including Inorganic Fullerene WS2 Nanoparticles," Wei Xiang Chen et al. Advanced Engineering Materials 2002, 4, No. 9, pp. 686-690.*
(Continued)

*Primary Examiner* — Patricia L Hailey
(74) *Attorney, Agent, or Firm* — Mark S. Cohen; Pearl Cohen Zedek Latzer Baratz LLP

(57) ABSTRACT

This invention relates to a hybrid component comprising at least one nanoparticle of inorganic layered compound (in the form of fullerene-like structure or nanotube), and at least one metal nanoparticle, uses thereof as a catalyst, (e.g. photocatalysis) and processes for its preparation.

14 Claims, 11 Drawing Sheets

(51) Int. Cl.
*B01J 35/00* (2006.01)
*B01J 35/06* (2006.01)
*C10G 45/04* (2006.01)
*B01D 53/86* (2006.01)
*B01J 37/16* (2006.01)
*B01J 37/02* (2006.01)

(52) U.S. Cl.
CPC ............ *B01J 37/16* (2013.01); *C02F 2305/08* (2013.01); *C02F 2305/10* (2013.01); *C10G 2300/202* (2013.01); *C10G 2300/70* (2013.01); *C10G 2300/703* (2013.01)

(56) References Cited

U.S. PATENT DOCUMENTS

| | | | |
|---|---|---|---|
| 4,853,359 A * | 8/1989 | Morrison et al. | 502/220 |
| 4,996,108 A * | 2/1991 | Divigalpitiya et al. | 428/411.1 |
| 6,217,843 B1 * | 4/2001 | Homyonfer et al. | 423/593.1 |
| 7,323,432 B2 * | 1/2008 | Niihara et al. | 502/300 |
| 7,641,886 B2 * | 1/2010 | Tenne et al. | 423/508 |
| 7,645,397 B2 * | 1/2010 | Parce et al. | 252/301.36 |
| 7,825,064 B2 * | 11/2010 | Wong et al. | 502/305 |
| 7,955,857 B2 * | 6/2011 | Bastide et al. | 436/155 |
| 8,110,522 B2 * | 2/2012 | Meitzner et al. | 502/220 |

OTHER PUBLICATIONS

MoS2—Ni Nanocomposites as catalysts for Hydrodesulfurization of Thiophene and Thiophene Derivatives, Fangyi Cheng et al. Advanced Materials 2006, 18, pp. 2561-2564.*

Cheng et al., MoS2—Ni Nanocomposites as Catalysts for Hydrodesulfurization of Thiophene and Thiophene Derivatives, Advanced Materials, 2006, pp. 2561-2564, vol. 18, WILEY-VCH Verlag GmbH & Co. KGaA, Weinheim, Germany.
Koningsberger, D., et al., Structure and Nature of the Active Sites in CoMo Hydrotreating Catalysts Conversion of Thiophene , Journal of Catalysis, 1998 pp. 108-116, vol. 175, No. 1, Academic Press.
Chen et al., Study on the Photocatalytic Degradation of Methyl Orange in Water Using Ag/ZnO as Catalyst by Liquid Chromatography Electrospray Ionization Ion-Trap Mass Spectrometry, Journal of the American Society for Mass Spectrometry, 2008, pp. 997-1003, vol. 19.
Zak, et al NANO, Insight Into the Growth Mechanism of WS2 Nanotubes in the Scaled-Up Fluidized-Bed Reactor, NANO: Brief Reports and Reviews,2009, pp. 91-98, vol. 4, No. 2, World Scientific Publishing Company.
Zak et al., Large-scale Synthesis of WS2 Multiwall Nanotubes and their Dispersion, an Update J. Sensors & Transducers , Sensors & Transducers Journal, 2011, pp. 1-10, vol. 12, IFSA.
Wang et al, Adsorption of CO2 on pristine Zn—ZnO(0001) and defected Zn—ZnO(0001): A thermal desorption spectroscopy study Surface Science, 2005, pp. 158-166, vol. 577, No. 2-3, Elsevier B.V.
Tsverin et al., Synthesis and characterization of WS2 nanotube supported cobalt catalyst for hydrodesulfurization, Materials Research Bulletin, Jul. 2012, pp. 1653-1660, vol. 47, No. 7, Elsevier B.V.

* cited by examiner

METAL NANOPARTICLE DEPOSITED INORGANIC NANOSTRUCTURE HYBRIDS, USES THEREOF AND PROCESSES FOR THEIR PREPARATION

STATEMENT REGARDING FEDERALLY SPONSORED RESEARCH OR DEVELOPMENT

This invention was made in part by United States Government support under DE-FG02-08ER15987 awarded by the U.S. Department of Energy, and under CHE-0743932 awarded by the U.S. National Science Foundation. The United States Government has certain rights in the invention.

FIELD OF THE INVENTION

This invention relates to a hybrid component comprising at least one nanoparticle of inorganic layered compound (in the form of fullerene-like structure or nanotube), and at least one metal nanoparticle, uses thereof as a catalyst, (e.g. photocatalysis) and processes for its preparation.

BACKGROUND OF THE INVENTION

Environmental problems associated with hazardous wastes, toxic water and air pollutions have attracted much attention in recent years. Among them, organic dyes that contain major group of pollutants produced during their use industrial processes, and organo-sulfur compounds in the form of thiophene, dibenzothiophene and related compounds that form a major part of sulfur contaminants in fuels. To solve these problems there is a need to develop reactive catalysts having specificity toward particular compounds, and resistance to catalyst poisoning resulting in quick reduction in reactivity.

Cheng et al. (*Adv. Materials* 2006, 18: 2561-2564) disclosed $MoS_2$ nanotubes decorated with Ni nanoparticles that exhibit high reactivity and selectivity with respect to thiophene and thiophene derivatives.

SUMMARY OF THE INVENTION

In the first aspect of the invention there is provided a hybrid comprising at least one inorganic layered compound (including any nanostructure thereof) and at least one metal (including also metal oxide) nanoparticle, for use in photocatalysis.

In the context of the present invention the term "hybrid" is meant to encompass a combination of at least two components comprising at least one type of inorganic layered compound and at least one type of metal nanoparticle in a composite, wherein said components are bonded in any type of bond (i.e. covalent, complex, intercalation, metal-metal, electrostatic, substitution bond (wherein said at least one metal in said inorganic layered compound is exchanged or substituted by another metal atom) and so forth).

The term "inorganic layered compound" is meant to encompass inorganic compounds (i.e. which do not consist of carbon atoms), capable of being arranged in stacked atomic layers, forming two dimensional sheets (i.e. sheet of an inorganic layered compound). While the atoms in within the layers are held together by strong chemical bonds, weak van der Waals interactions hold the layers together. For example, for an inorganic layered compound such as $SnS_2$, it was observed that each molecular layer of $SnS_2$ consists of a six fold-bonded tin layer "sandwiched" between two three-fold bonded sulphur layers, thus forming a sheet of $SnS_2$. α-SnS (herzenbergite) has a GeS structure with an orthorhombic (pseudo tetragonal highly distorted NaCl) unit cell (a=1.118 nm, b=0.398 nm, c=0.432 nm Pnma). Each tin atom is coordinated to six sulfur atoms in a highly distorted octahedral geometry. There are two corrugated tin sulfide double layers in a unit cell composed of tightly hound Sn—S atoms, the layers are stacked together by weak van der Waals forces.

In some embodiments said at least one inorganic layered compound is a compound of formula (I):

$$M_pX_n \qquad (I)$$

Wherein M is a metal selected from a transition metal, post-transition metal, metalloid, lanthanoid metal and actinoid metal; X is selected from S, Se, and Te; and p is 1 or 2; n is selected from 1, 2, 3, 4 and 5.

In some embodiments, said at least one first sheet has the general formula $(MX_n)_p$; wherein p is an integer selected from 1-5, i.e. said first sheet of inorganic layered compound $MX_n$ is formed of p molecular layers of $MX_n$. In further embodiments, said at least one second sheet has the general formula $(MX_m)_q$; wherein M and X are the same or different from said first sheet; m is an integer selected from 1, 2, 3, 4, and 5; q is an integer selected from 1-5; i.e. said second sheet of inorganic layered compound $MX_m$ is formed of q molecular layers of $MX_m$.

The term "ordered stacked sheets" or "ordered stacked configuration") relates to the arrangement of the sheets of an inorganic layered compound in a nanostructure (including for example inorganic nanotube and inorganic fullerene-like nanoparticles). According to the present invention, said at least one first sheet of an inorganic layered compound of general formula $MX_n$ is stacked on top of said at least one second sheet of an inorganic layered compound of general formula $MX_m$ (or vice versa, i.e. said at least one second sheet of an inorganic layered compound is stacked on top of said at least one first sheet of an inorganic layered compound). The stacked sheets are held together via van der Waals forces. The molecular "rims" at the edges of such inorganic layered materials are capable of being folded to form stable nanostructures wherein most of the inorganic atoms are fully bonded.

The order of the stacked sheets of a nanostructure of an inorganic layered compound includes any repeating arrangement of said first sheet (F) and second sheet (S), such as for example ( . . . FSFSES . . . ), ( . . . FFSFFSFFS . . . ), ( . . . SSFSSFSSF . . . ), ( . . . SSFFSFF . . . ), ( . . . FFSSEFSS . . . ) or any combination thereof.

Therefore, in some embodiments, a nanostructure of said at least one inorganic layered compound has the general formula $[(MX_n)_p(MX_m)_q]_r$, wherein r is an integer selected from 1-100. Thus, a layered inorganic compound in a hybrid of the invention is formed by repeating an ordered stacked unit of $(MX_n)_p(MX_m)_q$ r times. In some embodiments r is an integer selected from 10, 20, 30, 40, 50, 60, 70, 80, 90, 100.

In some embodiments, M is selected from W, Mo, V, Zr, Hf, Pt, Rc, Nb, Ti, Ga, In, Sn, Pb, Ta and Bi.

In some embodiments said at least one inorganic layered compound is selected from a group consisting of $WS_2$, $MoS_2$, $WSe_2$, $MoSe_2$, $NbS_2$, $ReS_2$, $TiS_2$, $TaS_2$ $ZrS_2$, InS, GaS and any combination thereof. In some specific embodiments, said at least one inorganic layered compound is $WS_2$.

The term "nanostructure" is meant to encompass any three dimensional structure having at least one dimension in the nano-range scale (i.e. between 0.1 and 100 nm). According to the present invention a nanostructure comprises sheets of at least one first sheet of an inorganic layered compound of general formula $MX_n$; and at least one second sheet of an inorganic layered compound of formula $MX_m$, wherein said sheets are stacked in an ordered configuration. In some embodiments, said nanostructure is selected from a nanotube, a nanoscroll, a nanocage, fullerene-like nanostructures or any combination thereof. In some embodiments said inorganic layered compound is in the form of fullerene-like nanoparticle.

In some embodiments said at least one inorganic layered compound in a hybrid of the invention is in the form of a nanotube.

The term "metal nanoparticle" is meant to encompass a particle of at least one elemental metal or alloy thereof having any shape with an equivalent diameter or aspect ratio of approximately 1 to 100 nm. In some embodiments, said metal is a metal oxide. In other embodiments, said metal is at least partially covered on its surface with a metal oxide.

In further embodiments said at least one metal nanoparticle is selected from early transition metals such as for example Ni, Co, Fe, Ti, Cu, V, Mn, Cr, Au, Pt, Pd, Ru, Rh, Ir, Ag, Os and any combinations thereof and any oxides thereof (such as for example magnetite). In some specific embodiments said at least one metal nanoparticle is Co or Ni, including any alloys thereof. In other embodiments said at least one metal nanoparticle is selected from lanthanide metals, such as for example Ln, Gd, Ce, Sm, and any combinations thereof and any oxides thereof.

In some embodiments, said at least one metal nanoparticle is deposited in the surface of said at least one inorganic layered compound (or nanostructure of said at least one inorganic layered compound).

The term "deposited" (including any of its lingual variations) should be understood to refer to said at least one type of metal nanoparticle being bonded on the inner or outer surface of said at least one type of inorganic layered compound (i.e. on the nanostructure form of said inorganic layered compound). Said bond may be any type of bond (i.e. covalent, complex, intercalation, metal-metal, electrostatic, substitution bond (wherein said at least one metal in said inorganic layered compound is exchanged or substituted by another metal atom) and so forth). Said deposition of said at least one type of metal nanoparticle on the outer or inner surface of said at least one type of inorganic layered compound may be achieved using any deposition process known to a person skilled in the art, such as for example electroless plating process.

It should be understood that when said at least one metal nanoparticle is deposited on the surface of said at least one inorganic layered compound (or nanostructure of said at least one inorganic layered compound), it may cover at least a portion of the outer surface of said nanostructure (or compound) in a homogeneous or heterogeneous form. In some embodiments said at least one metal nanoparticle may also be deposited on the inner surface of said nanostructure of said at least one inorganic layered compound (in nanostructure that comprise such inner surface, i.e. nanotubes) in a homogeneous or heterogeneous form.

In other embodiments, the surface coverage of said at least one inorganic layered compound by said at least one metal nanoparticles is between about 0.1% to about 70%.

In other embodiments, the surface coverage of said at least one inorganic layered compound by said at least one metal nanoparticles is between about 0.1%, 0.2%, 0.3%, 0.4%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65% to about 70%.

In further embodiments said at least one nanoparticle has a particle size of between about 1niu to about 100 nm.

In further embodiments said at least one nanoparticle has a particle size of between about 1 nm, 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm to about 100 nm.

In other embodiments diameter of said nanotube and nanoparticle is in the range of between about 20 nm to about 200 nm.

In other embodiments said diameter of said nanotube and nanoparticle is in the range of between about 20, 25, 30, 35, 40, 45, 50, 55, 60, 65, 70, 75, 80, 85, 90, 95, 100, 110, 120, 130, 140, 150, 160, 170, 180, 190 to about 200 nm.

The term "photocatalysis" or any of its lingual forms used herein is meant to encompass any qualitative or quantitative acceleration of a photoreaction. Under these conditions said hybrid of the invention is defined to be a photocatalyst.

In catalyzed photolysis, light is absorbed by an adsorbed substrate. In photogenerated catalysis, the photocatalytic activity (PCA) depends on the ability of the photocatalyst to create electron-hole pairs, which generate free radicals able to undergo secondary reactions, in some embodiments said photocatalytic process enables the removal of organic compounds (impurities) from the aqueous solutions, by the reaction thereof in the presence of said photocatalyst and their degradation to removable products (called also mineralization).

The illumination of the photocatalyst forms the electron (e−)/hole (h+) pairs, which can recombine or dissociate with the release of h+ and e− to the surface of the catalyst particles. The holes interact with the water molecule to form hydrogen gas and hydroxyl radical. The electron interacts with oxygen molecule to form super oxide anion. The resulting free radicals are very potent oxidizers of organic compounds. For example $TiO_2$ has a wide band gap close to 3.11 eV. Such wide band gap makes the absorption edge of $TiO_2$ to be within only UV region. Layered compounds, such as $MoS_2$ and $WS_2$ have a narrow band gap close to 1.7 eV and 1.5 eV respectively. This lies within the visible region.

In another one of its aspects the invention provides a process for the preparation of a hybrid comprising at least one inorganic layered compound or fullerene-like nanoparticle and at least one metal nanoparticle, said process comprising:
  providing at least one inorganic layered compound (such as for example inorganic nanotube) or fullerene-like nanoparticle;
  electroless plating at least a portion of the surface of said nanotube with at least one metal nanoparticle; thereby providing said hybrid.

The term "electroless plating" is meant to encompass chemical or auto-catalytic plating, is a non-galvanic type of plating method that involves several simultaneous reactions in an aqueous solution, which occur without the use of external electrical power.

In some embodiments a process of the invention further comprising surface activation of said nanotube surface prior to plating.

The term "surface activation" is meant to encompass a preliminary process for the preparation of a hybrid of the invention wherein nucleation centers are formed on the surface of said inorganic layered compound or nanostructure. In some embodiments surface activation is achieved by depositing Pd nanocrystallites onto the INT/IF surface. Said nucleation centers may be formed either by the chemical exposure of the INT/IF to a chemical reactive reactant solution. In other embodiments said nucleation centers are formed by electrochemical deposition.

In a further aspect, the invention provides a method of catalyzing an organic decomposition reaction, comprising performing said organic decomposition reaction in the presence of at least one catalyst comprising at least one inorganic layered compound or fullerene-like nanoparticle and at least one metal nanoparticle.

The term "catalyzing an organic decomposition reaction" is meant to encompass any quantitative or qualitative acceleration of the rate of an organic decomposition reaction, wherein an organic compound (for example an organic compound, either as a solid or liquid that is immiscible in a different liquid) is decomposed to other products, usually shorter molecular species, like methane; $CO_2$ and other gasses. In some embodiments said decomposition products are removed from said liquid, e.g. as gasses, or other volatile species.

In a further aspect the invention provides a method of removing organic contaminants from a liquid comprising initiating an organic decomposition reaction in the presence of at least one catalyst comprising $WS_2$ nanostructure and at least one metal nanoparticle.

In the context of the present invention when referring to the "removal of organic contaminants" should be understood to include any qualitative or quantitative removal of said organic contaminants (whether complete or partial) from said liquid by for example their decomposition reaction catalyzed by a hybrid of the invention to degradation or decomposition products that are removable from said liquid in a comparatively easier manner (such as for example heating, extraction, filtering etc.). In some embodiments said liquid is immiscible with said organic contaminants. In some embodiments said liquid is water.

In a further one of its aspects the invention provides a hybrid comprising $WS_2$ nanostructure and at least one metal nanoparticle. In some embodiments said at least one metal nanoparticle is selected from Ni, Co, Fe, Ti, Cu, V, Mn, Cr, Au, Pt, Pd, Ir, Ru, Ag, Rh, Os and any combination thereof and oxides thereof.

In a further aspect the invention provides a catalytic agent comprising a hybrid as defined herein. In some embodiments said catalytic agent of the invention is used in the catalysis of an organic decomposition reaction. In some further embodiments said decomposition reaction is hydrodesufurization reaction, i.e. catalytic removal of organic sulfur compounds from fuel.

In a further aspect the invention provides a hybrid comprising $WS_2$ nanostructure and at least one metal nanoparticle for use in the catalysis of an organic reaction. In some embodiments said reaction is an organic decomposition reaction. In further embodiments said decomposition reaction is hydrodesufurization reaction.

In some embodiments a hybrid of the invention comprises $WS_2$ nanostructure and at least one metal nanoparticle is selected from Ni, Co, Fe, Ti, Cu, V, Cr, Mn, Au, Pt, Pd, Ir, Rh, Ru, Ag, Os and any combination thereof (including alloys thereof) and any oxides thereof (such as for example magnetite). In some embodiments said metal nanoparticle is Co.

In a further aspect the invention provides a hybrid comprising at least one inorganic fullerene-like nanoparticle and at least one metal nanoparticle.

In another one of its aspects the invention provides a composition comprising a hybrid as defined herein.

A composition of the invention may be used in any appropriate application including, but not limited to catalysis, drug delivery, liquid crystal fabrication, solar cells and electronic devices.

Thus, according to a further aspect the invention provides a composition comprising a hybrid of the invention and at least one pharmaceutically active agent. In some embodiments, said composition is intended for use in the delivery of said pharmaceutically active agent.

BRIEF DESCRIPTION OF THE DRAWINGS

In order to understand the invention and see how it may be carried out in practice, embodiments will now be described, by way of non-limiting example only, with reference to the accompanying drawings, in which:

(FIG. 2a) image of a zero loss signal of single nanotube (FIG. 2b) cobalt map (Co-L2,3 edge) (FIG. 2c) oxygen map (O-K edge), (FIG. 2d) combined elemental map of cobalt and oxygen.

(FIG. 5c) GC transients of reference compounds, as indicated (FIG. 5d) GC transients of Co coated $INT-WS_2$ sample.

Figures 1A, 1B, 1C, 1D:
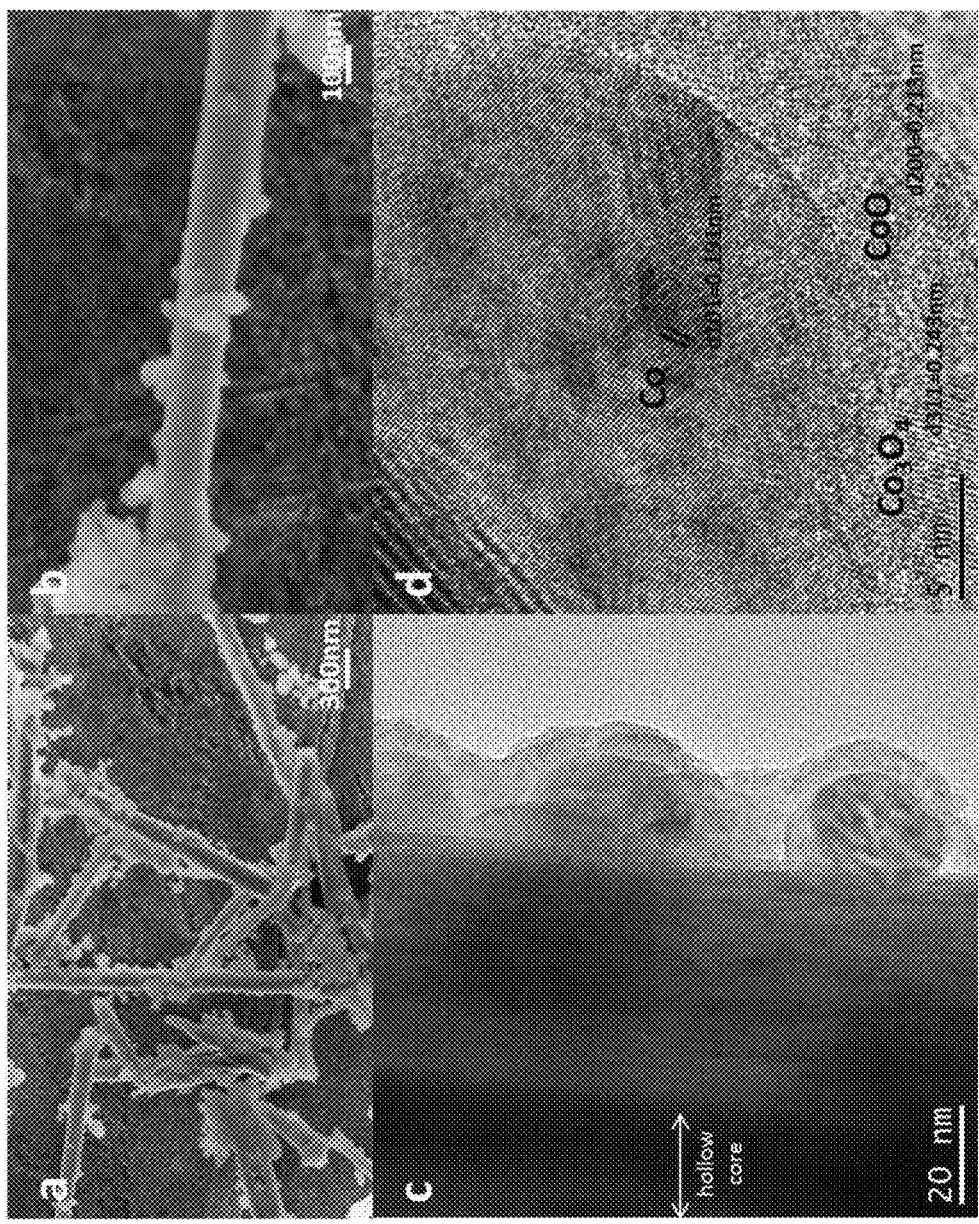
FIGS. 1a-1d show SEM images of (FIG. 1a) $WS_2$ nanotubes decorated with Co-nanoparticles (FIG. 1b) close-up view of a single coated nanotube. HRTEM micrographs of (FIG. 1c) cobalt nanoparticles covered by oxide layer and attached to the surface of the nanotube (FIG. 1d) a close-up of the image showing lattice spacing of Co d(101)=0.191 nm, CoO d(200)=0.213 nm, and $Co_3O_4$ d(311)=0.243 nm.

11d) comparison of coated nanotubes before and after photocatalysis with dominant peaks of MO (shifted for clarity).

DETAILED DESCRIPTION OF EMBODIMENTS

Example 1

Nanofabrication and Sample Characterization of Hybrid of the Invention ($WS_2$/Co NP)

Generally, the procedure of metal coating can be divided into two steps: surface activation process of the INT nanotubes and electroless plating of the surface.

a) Surface Activation of INTs

Surface activation of the INT-$WS_2$ (purchased from Nano-Materials Ltd and synthesized according to disclosure in A. Zak, et al NANO, 2009, 4(2): p. 91-98 and A. Zak et al., J. Sensors & Transducers 12, 140 (2011)), was achieved by depositing Pd nanocrystallites onto the nanotubes surface. This preliminary process was required in order to create nucleation centers for the metal deposition. For this purpose the $SnCl_2$/$PdCl_2$ system was used. The $WS_2$ nanotubes (20 mg) were immersed in an aqueous solution of $SnCl_2 \cdot 2H_2O$ and HCl (0.004/0.096 M, respectively) for sensitization and were ultrasonically agitated for 5 min at room temperature (RT). The sensitized nanotubes were retrieved from the solution by centrifugation at 2700 rpm for 1.5 min, and re-immersed in de-ionized water (DI). Thereafter, the nanotubes were again retrieved by centrifugation and were immersed and ultrasonically agitated for 5 min at RT in an aqueous solution of $PdCl_2$ and HCl (0.002/0.096 M, respectively), to create palladium catalytic nucleation sites onto the surface of the nanotube. Finally, another step of centrifugation, rinsing in DI and repeated centrifugation was performed. The last procedure is aimed at separating the Pd activated nanotubes from the solution and remove excessive metal ions.

b) Electroless Plating

Pd-activated INT-$WS_2$ were inserted into the electroless plating solution, where cobalt deposition took place. Cobalt (II) chloride ($CoaI_2 \cdot 6H_2O$, 10 ml, 0.095 M) and sodium citrate ($Na_3C_6H_5O_7 \cdot 2H_2O$, 10 ml, 0.282 M) were dissolved in DI and mixed for complexation permitting control of the reaction rate. In order to reduce the cobalt ions, the reduction agents DMAB (($CH_3$)$_2$$NH \cdot BH_3$, 10 ml, 0.023 M) and sodium hypophosphite ($NaH_2PO_2O_2 \cdot H_2O$, 10 ml, 0.203 M) were added one after the other into the Co ions solution. The pH was adjusted to 9.5 by ammonia solution and the temperature was set to 70° C. At that point, 2.0 mg of the activated INT-$WS_2$ were added to 15 ml of the Co solution and the suspension was maintained at 70° C. for 20 min. After deposition, the coated nanotubes were sonicated for 5 min and only then retrieved from the Co solution, and rinsed by DI several times as explained before, by centrifugation. Later the product was dried at 100° C. in a vacuum oven for 30 min.

c) Characterization

The morphology and topography of the hybrid nanostructures were analyzed by a scanning electron microscope (SEM, LEO model Supra 7426). The atomic-scale structure and chemical composition were determined by transmission electron microscopy (TEM Philips CM-120) in conjunction with energy dispersive spectroscopy (EDS EDAX Phoenix Microanalyzer); high resolution transmission electron microscope (HRTEM) with a field emission gun (FEI Technai F-30) equipped with a parallel electron energy loss spectroscopy (EELS) detector (Gatan imaging filter, GIF; Gatan); transmission electron microscopy (TEM) and scanning transmission electron microscope (STEM) equipped with high angle annular dark field (HAADF) detector (FEI Tecnai G2 F20). Phase analysis was done with X-ray powder diffractometry (XRD, Ultima III, Rigaku, Japan).

Results

Multiwall $WS_2$ nanotubes were decorated with cobalt NP by electroless plating method. Prior to the electroless plating process palladium nanoparticles were seeded on the nanotube surface to promote the reactivity of the basal plane (0001) of the $WS_2$ nanotube's surface. The two-step sensitization-activation procedure provided possible catalytic centers for the following step of electroless plating. In the sensitization step $Sn^{+2}$ ions adsorb onto the surface of the $WS_2$ nanotubes and, in the following step, reduce the $Pd^{2+}$ ions to palladium NP that provide catalytic centers for electroless plating. These catalytic centers were used for reduction of the metal ions and formation of metal islands on the surface of the nanotubes in the electroless process.

FIG. 1a shows SEM micrographs of the surface modified $WS_2$ nanotubes. As can be seen from FIG. 1b the surface of the nanotube is not completely and uniformly covered by the cobalt NP. The incomplete coverage is due to the fact that the surface activation process produces a nonhomogeneous distribution of catalytic sites on the surface of the tubes. The metal nanoparticles nucleate and grow on these catalytic centers thus producing non uniform layer. Despite the rinsing procedure, agglomerates of cobalt nanoparticles which were not attached to the surface of the nanotubes were also discernible in the final product.

The crystalline structure of the cobalt NP was analyzed by HRTEM (FIG. 1c and FIG. 1d). The discontinuous layer of cobalt consists of NP about 10-20 nm in size. FIG. 1c indicates that these NP are covered by a partially amorphous thin layer, probably cobalt oxide. The cobalt nanoparticles exhibit an hcp structure with d-spacing of 0.191 nm corresponding to the (101) main peak of the hcp cobalt structure (FIG. 1d). In the case of the partially amorphous material on the NP surface, two different sets of fringes were recognized, 0.213 and 0.243 nm, matching the CoO (200) and $Co_3O_4$ (311), respectively.

Figures 2A, 2B, 2C, 2D:
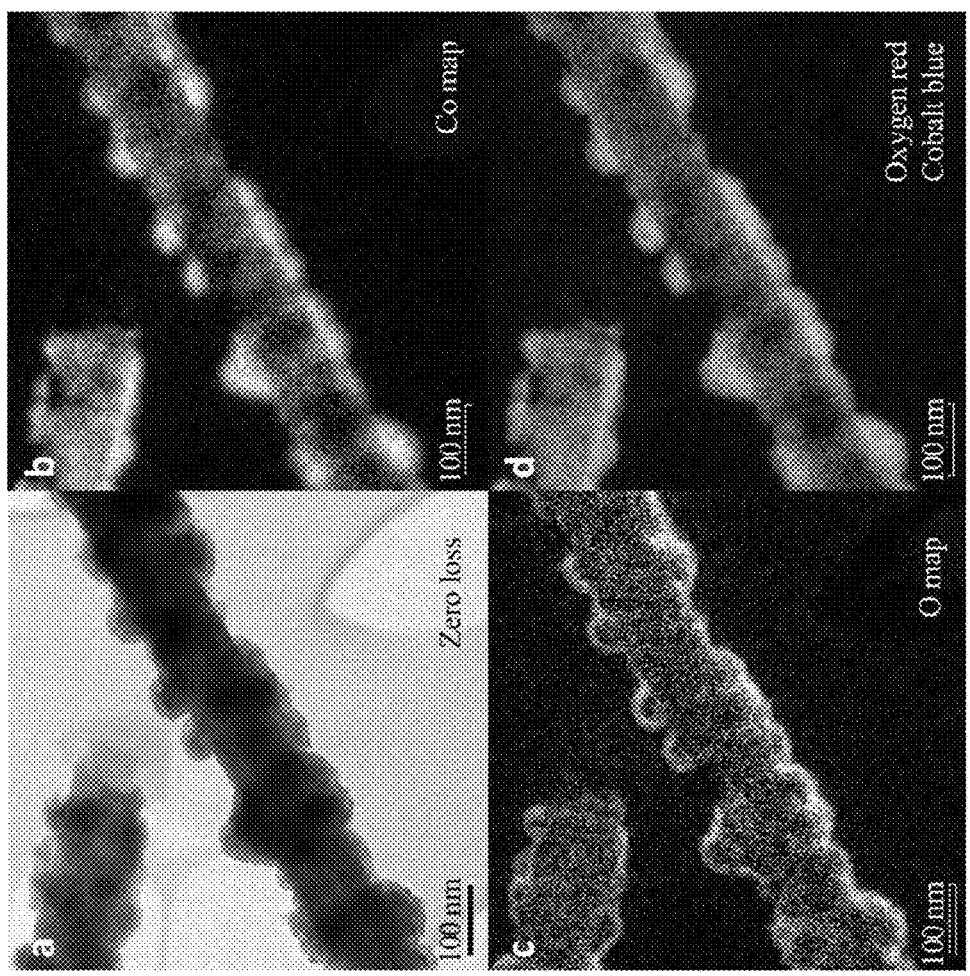
FIGS. 2a-2d show EFTEM elemental mapping of the $WS_2$ nanotube surface.

Elemental mapping of the surface of the $WS_2$ nanotubes was performed by EFTEM (enerey filtered TEM). FIG. 2 shows the presence of a few nanometer thick oxidation layer on top of the metallic cobalt particles. The formation of the cobalt oxide top film could be attributed to the open-air conditions during the reaction and the final drying (100° C.). Moreover the small size of the NP leads to an accelerated diffusion of the oxygen through their volume.

Figures 3A, 3B, 3C, 3D:
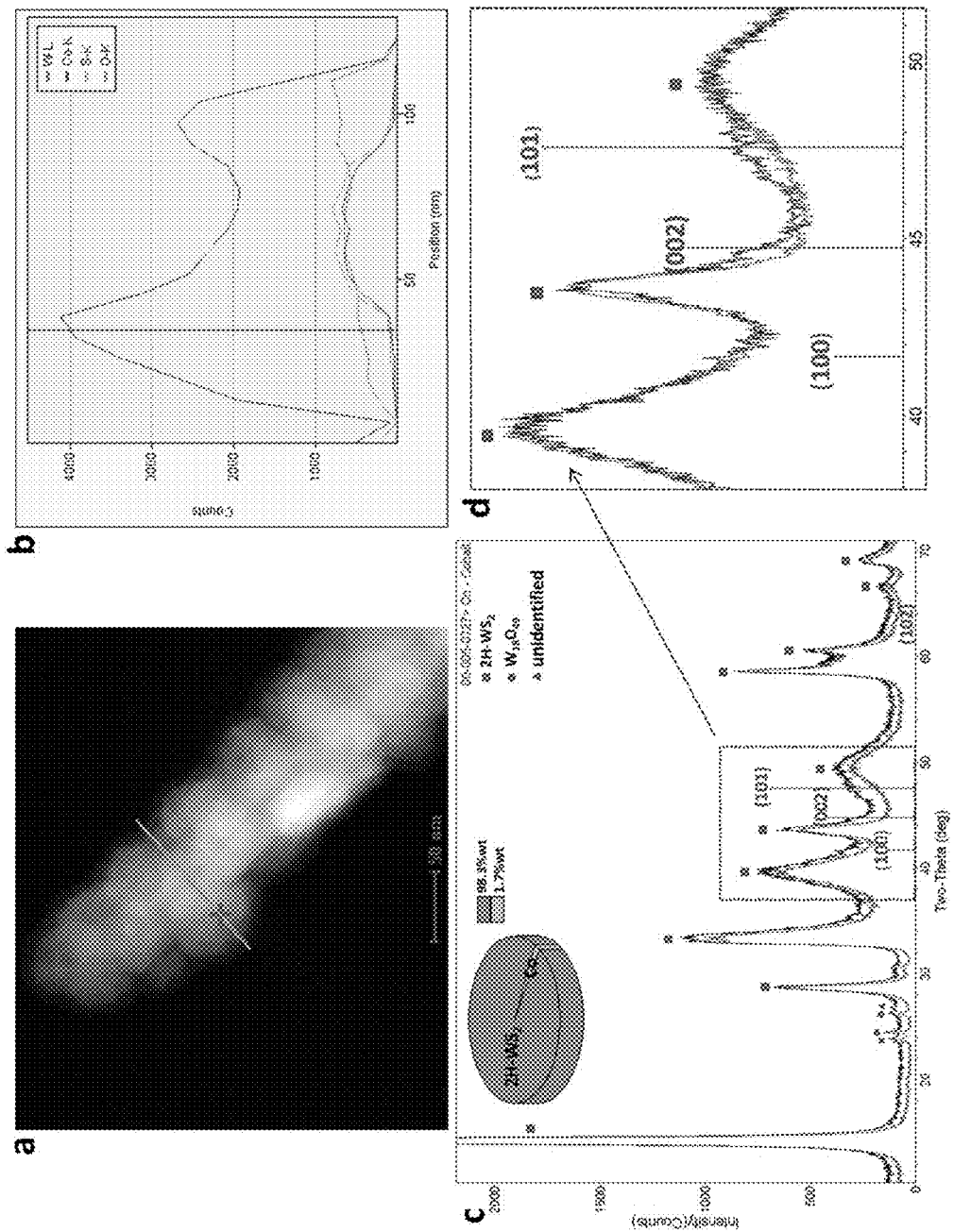
FIGS. 3a-3d show STEM/EDS analysis of (FIG. 3a) electroless deposited cobalt nanoparticles on $WS_2$ nanotube surface. The line and cross indicate the location and direction of EDS analysis (FIG. 3b) line scan analysis carried out on the line (FIG. 3c) XRD patterns of electroless coated $WS_2$ nanotubes, the diffraction pattern of $WS_2$ powder (bottom curve) and $WS_2$ coated with cobalt (top curve); in the inset is shown a quantitative analysis from profile-fitted peaks (FIG. 3d) magnified area of cobalt diffraction peaks.

EDS analysis of the electroless cobalt coated nanotubes was also carried out by STEM (FIG. 3). STEM images of cobalt coated nanotubes are shown in FIG. 3a, the corresponding EDS line scan analysis is shown in FIG. 3b. The line and the cross indicate the corresponding location and the direction in the scan images. It can be seen that cobalt is not uniformly distributed across (along) the nanotube. The cobalt peak rises at the edges of the nanotube and decreases as the scan moves towards the center of the nanotube diameter. Small but almost uniform oxygen line is present across the coated nanotube.

The HRTEM result was in good agreement with the XRD analysis, FIG. 3c depicts diffraction patterns of pristine $WS_2$ nanotubes (bottom curve) and cobalt coated nanotubes (top curve). The coated sample was found to consist of $WS_2$ (2H phase) and cobalt. Three characteristic peaks (FIG. 3d) of cobalt in the hcp phase distinguish between two curves. The hcp phase of the cobalt is probably due to the low deposition temperatures, 70° C., where this phase of cobalt predominates. Cobalt oxide peaks were not found in the XRD pattern, probably since it forms only a thin partially amorphous layer. The Co fraction calculated from the diffractogram was about 1.7 wt % (see inset of FIG. 3c), but it includes both the deposited layer and the residual agglomerates. Therefore, the cobalt coating of the nanotubes is likely to be less than 1.7 wt %. A residual amount of $W_{18}O_{49}$ is present in the pattern, possibly remaining from the INT-$WS_2$ synthesis, in the inner core of the nanotubes.

Thus, INT-$WS_2$ nanotubes were successfully plated with cobalt nanoparticles by the electroless plating method. The relatively inert surface of the nanotubes was activated by Sn—Pd nanopaiticles using a two-step sensitization-activation system. These activated nanotubes served as a catalytic substrate for electroless plating of cobalt. The cobalt coating was characterized by various analytical tools, which clarified morphology, crystallinity and chemical composition. It was observed that cobalt form non-uniform coating due likely to the heterogeneously distributed catalytic sites on the surface of the nanotubes. The cobalt particles attached to the surface of nanotubes had an hcp crystal structure. These particles were covered by thin cobalt oxide layer.

Example 2

Catalysis Properties of Hybrid of the Invention ($WS_2$/Co NP) Under Ambient Pressure The kinetics of thiophene hydrodesulfurization (HDS) on the unsupported powder catalyst was characterized at North Dakota State University (NDSU) by means of an atmospheric flow reactor. $H_2$ gas (20 ml/min, Praxair, 99.999%) was passed through a temperature stabilized saturator (at 30° C.) containing liquid thiophene (Sigma-aldrich ≥99%). The flow rate of the hydrogen was controlled via a flow regulator (Brooks SLA-5850S). The mini reactor consists of a U-shaped quartz tube (Robinson Scientific, UK) inside a vertical tube furnace (Carbolite VST 12/300). The catalyst material was presulfided in the reactor at 600 K for 30 min with the thiophene/hydrogen mixture. A delay of 15 min was allowed in order to reach thermal equilibrium. At this point, the reaction products were sampled by the gas chromatograph (GC) (Varian CP-4900) equipped with CP-Sil-5CB-4m column and a thermal conductivity detector, using nitrogen (Praxair, 99.999%) as the carrier gas. Typically 27.5 mg of the catalyst powder was gently mixed with glass wool (Quartz Scientific, Inc.). Water and oxygen filters (Agilent-Big Universal Trap) were mounted in the $N_2$ and $H_2$ gas lines. All gas lines were kept at elevated temperature by means of heating belts. Blind experiments with an empty reactor and one which contained only the glass wool were conducted. No reaction products were formed in this case.

Figure 4:
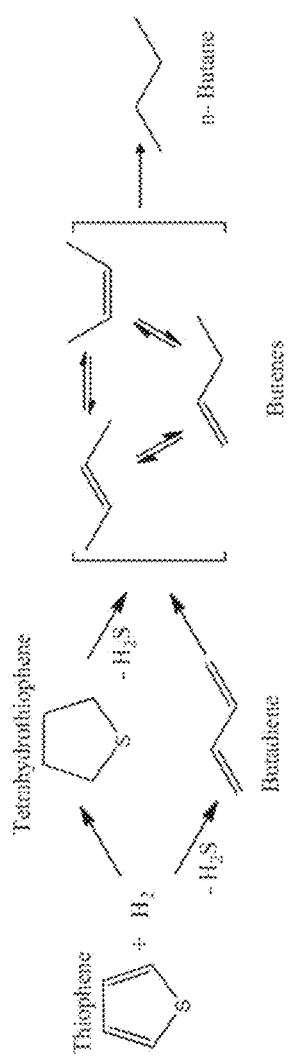
FIG. 4 depicts the proposed reaction pathways of thiophene in the HDS process.
Figures 5A, 5B, 5C, 5D:
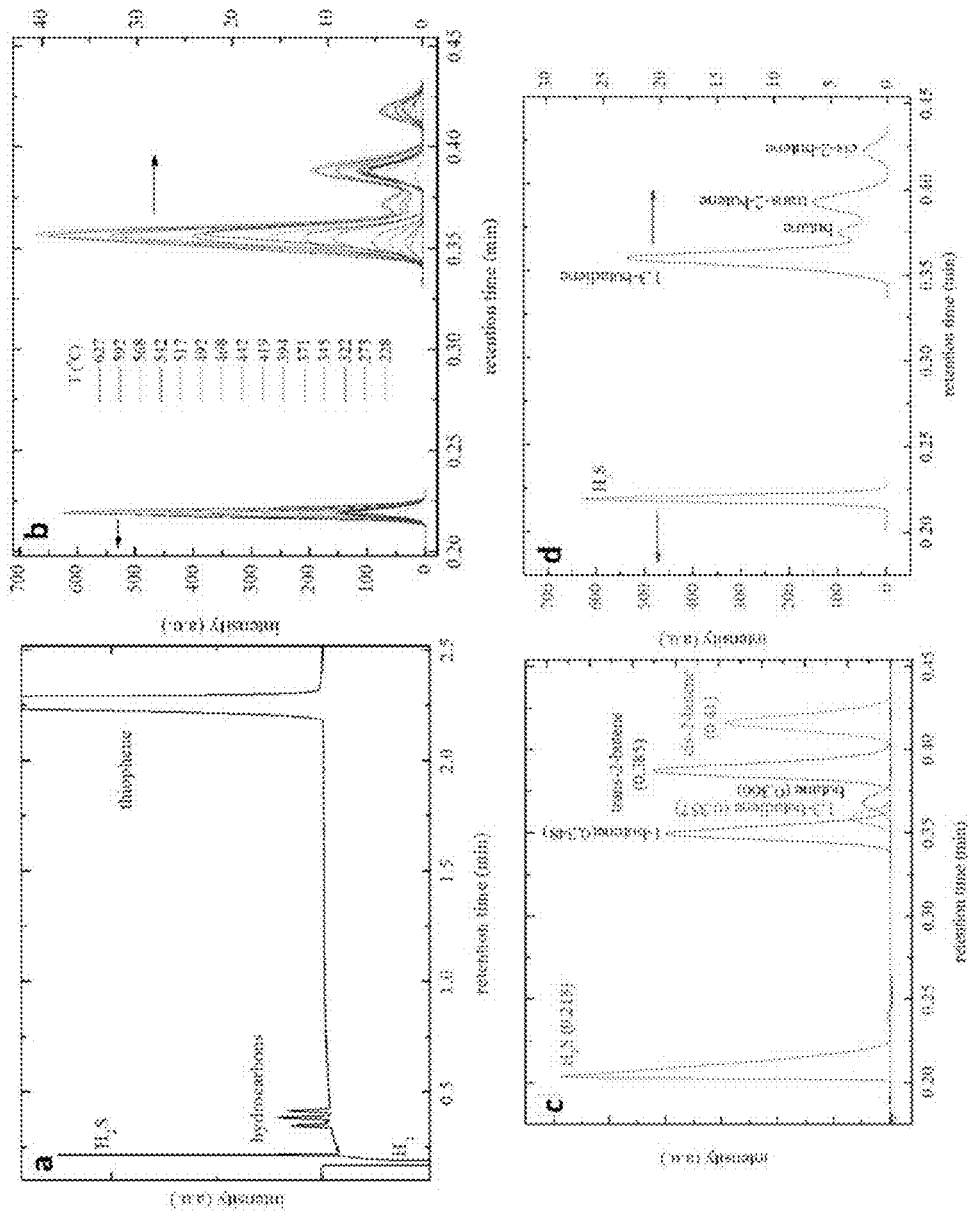
FIGS. 5a-5d show gas chromatograph (GC) survey scan (FIG. 5a) for Co coated $INT-WS_2$ (FIG. 5b) $H_2S$ and hydrocarbon region of GC scans as a function of the reaction temperature.

The produced coated INT-$WS_2$ were tested for catalytic cavity, since an active component such as cobalt nanocrystallites makes a coated INT-$WS_2$ a promising material for potentially viable heterogeneous catalyst in the HDS process. The catalytic activity of the produced cobalt coated nanotubes towards thiophene desulfurization was characterized at ambient pressure using a mini reactor. FIG. 5a depicts typical survey spectra of gas chromatograph (GC) transients for the Co coated INT-$WS_2$ samples. The $H_2$ and thiophene signals come from the gas mixture used to drive the HDS reaction. $H_2S$ and hydrocarbons are the reaction products formed. These reaction products are consistent with the proposed HDS mechanism for thiophene, shown in FIG. 4. HDS of the thiophene occurs via two parallel pathways. In the first pathway the sulfur atom is removed directly from the thiophene molecule involving direct desulfurization (hydrogenolysis pathway). On the other hand, in the second pathway the sulfur atom is removed by hydrogenation of the aromatic ring (hydrogenation pathway). Both reactions occur simultaneously using different active sites of the catalyst surface.

In order to verify the reaction products, GC transients of a number of reference compounds were collected including $H_2S$, 1-butene, 1,3-butadiene, butane, trans-2-butene, and cis-2-butene (see FIG. 5c). FIG. 5d reproduces a typical GC transient of the Co coated INT-$WS_2$ sample for the retention time regime of the products. Four GC features are evident in the GC transients that belong to formed hydrocarbons which are fully in line with the proposed thiophene decomposition reactions. Accordingly, 1,3-butadiene dominates the product formation with trans-2-butene and cis-2-butene as minor products. Traces of butane are additionally formed. The identification of the reaction products may not be unique, but it is clear that sulfur free reaction products are indeed formed.

The $H_2S$ and hydrocarbon regions are shown (see FIG.5b) as a function of reaction temperature. Although, the Co coated INT-$WS_2$ are catalytically active, unfortunately $H_2S$, an undesirable byproduct, dominates the product formation. Comparing GC peak areas reveals that at 627° C. the $H_2S$ peak is by a factor of 7.6 larger than that of the hydrocarbons. The increase of the $H_2S$ can be attributed to the hydrogenation of the more strongly bonded sulfur atoms, e.g. sulfur atoms at the edges of INT-$WS_2$. Most likely the hydrogen reacts with the surface sulfur atoms, creating sulfur vacancies at the edge of the nanoparticles and producing $H_2S$. Furthermore, as expected, the peak intensities increase with reaction temperature (FIG. 5d). Therefore, indeed thiophene is desulfurized, i.e., an active nanocatalyst has been fabricated.

Figure 6:
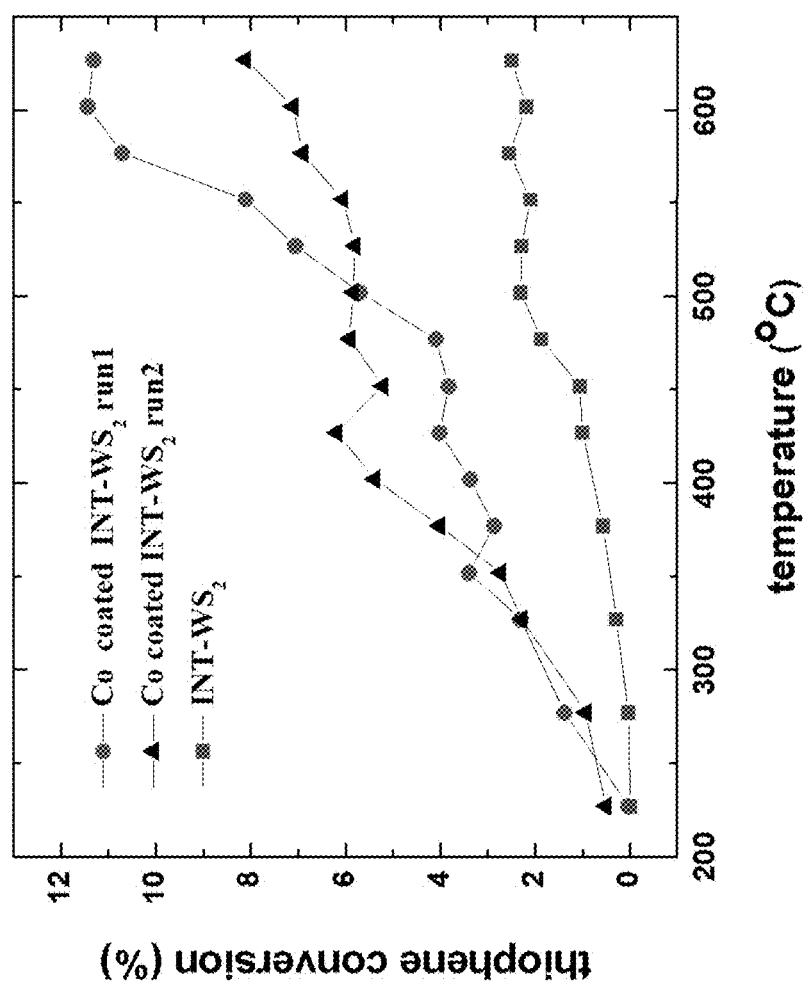
FIG. 6 shows the thiophene conversion rates of Co coated $INT-WS_2$ (first and second runs) and pristine $INT-WS_2$ as a function of time.

FIG. 6 presents an analysis of the GC traces which are shown in FIG. 3b. Depicted is the thiophene conversion rate, r, as a function of reaction temperature. The HDS conversion rates were calculated following the procedure outlined by Koningsberger, D., et al. (in Journal of Catalysis, 1998. 175 (1): p. 108-116). Accordingly, the conversion rate, r, is given by $$r = \frac{\sum_i \text{products}_i}{\sum_j \text{products}_j + \text{thiophene}} \times 100\% \qquad (1)$$

using background corrected GC peak areas. Thus, the total amount of non-sulfur containing reaction products is considered (Products in equation 1 includes $H_2S$). Data for the Co coated and uncoated INT-$WS_2$ are summarized. Catalyst deactivation was evaluated by repeating the experimental runs, i.e., two subsequently collected experimental data sets are shown.

The thiophene conversion rates increase with the reaction temperature. Conversion rate of about 12% was obtained for the coated INT-$WS_2$ at the greatest accessible reaction temperature of 627° C. The cobalt-coated INT-$WS_2$ powder is clearly more reactive than the identical, but uncoated nanotubes system which reached conversion rates of only ~2%. This result indicates that the cobalt promoter affected the catalytic activity. Because the catalytic process generally occurs at the prismatic (hk0) edges of $WS_2$ ($MoS_2$) and corners rather than on the basal (0001) plane, the INT-$WS_2$ with a high basal plane to edge area ratio reveal a low HDS reactivity towards thiophene. But the addition of the cobalt nanoparticles coating clearly promotes the conversion rates by a factor of ~6. This suggests that the interface between cobalt and INT-$WS_2$ promotes the catalytic reaction.

Only small variations of the catalyst activity over time were evident (compare 1$^{st}$ and 2$^{nd}$ run data in FIG. 6). It is also important to note that the powders were kept under high vacuum conditions in the transfer step between the two labs. However, further long time tests would be required to quantify the catalyst deactivation. The effect of the thin cobalt oxide film coating the Co nanoparticles on the HDS reaction has not been studied in the present work, and should be further investigated in the future Thus, the results show that the hybrid of the invention has unexpected catalytic reactivity for HDS. In addition, the hybrid was proved to be catalytically more active than the pristine INT-WS$_2$ system.

Example 3

Catalysis Properties of Hybrid of the Invention (WS$_2$/Co NP) Under Ultra-High Vacuum A small amount of hybrid catalyst (WS2/Co NP) powder was suspended in benzene and mildly sonicated at room temperature with a bench top sonicator. A few 50 μl aliquots were dropped-and-dried on a silica support (SiO$_2$ with 1 μm thermal oxide layer from University Wafer, Mass., USA).

The kinetic experiments were conducted in a standard UHV system; the TDS (thermal desorption spectroscopy) set-up is described by Wang et al (*Surface Science*, 2005, 577(2-3): p. 158-166). In a typical TDS experiment, the sample temperature is increased linearly and the desorbing species are simultaneously detected with a mass spectrometer. A heating rate of 2 K/s has been used; the gas exposures, are given in Langmuir (1 L=1 s gas exposure at 1×10$^{-6}$ mbar). The probe molecule thiophene (99+% from Sigma-aldrich) was cleaned by multiple freeze-pump-thaw cycles; hydrogen (Praxair, 99.999%) was dosed on the surface by means of a capillary closer to which a hot tungsten filament, for partial dissociation of the hydrogen, was attached. Scanning electron microscope (SEM) characterization directly of the drop-and-dry samples (not shown) was conducted at Brookhaven National fabs with a Hitachi S-4800 UHR that has a nominal resolution of 2 nm.

UHV Sample Characterization

Figure 7:
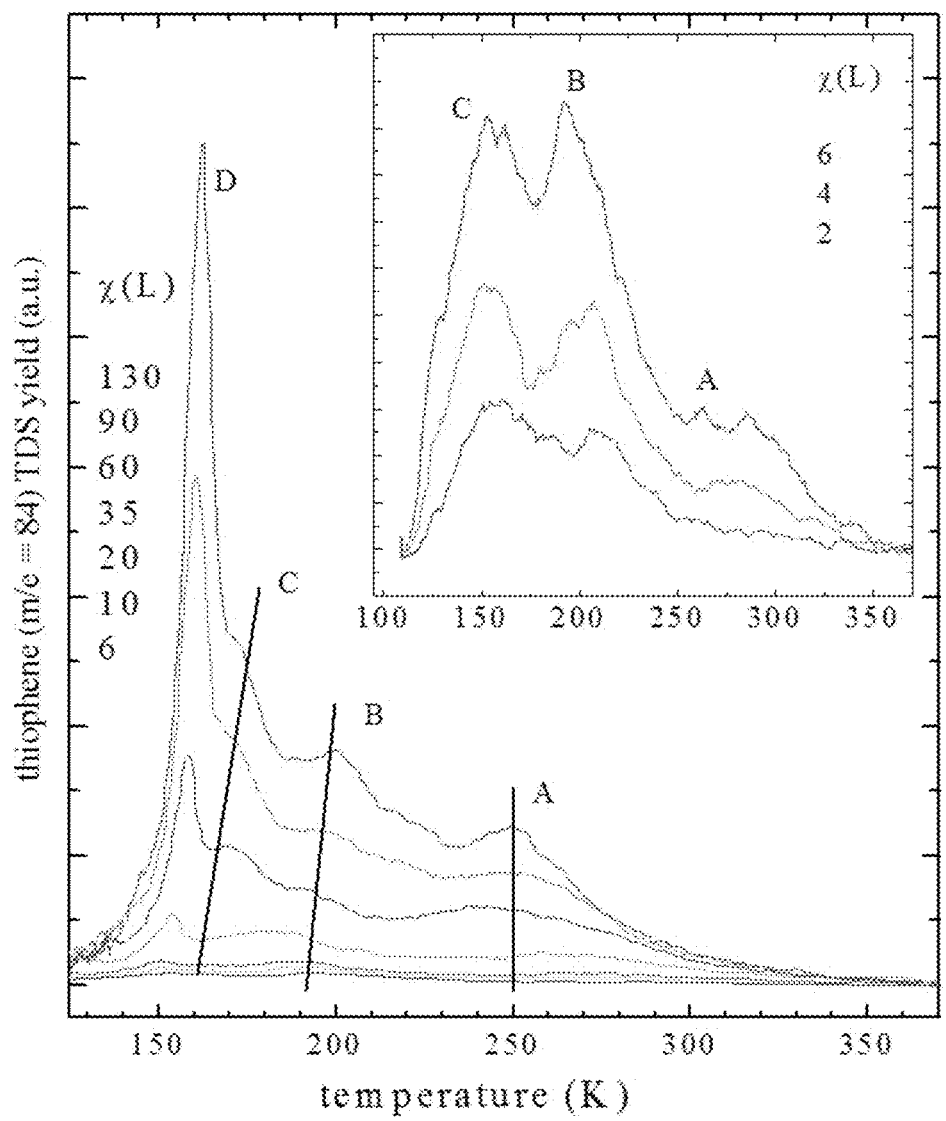
FIG. 7 shows the thermal desorption spectroscopy data of thiophene as a function of thiophene exposure given in Langmuirs. The peaks A through C are assigned to thiophene adsorption on internal, external, and groove sites. The D peak refers to condensed thiophene.

Ultra high vacuum (UHV) thermal desorption spectroscopy (TDS) data of Co coated WS$_2$ nanotubes supported on silica are shown in FIG. 7. The thiophene exposure, χ, was varied while detecting the parent mass of thiophene. TDS serves as a further materials characterization technique and yields binding energies of molecular thiophene (C$_4$H$_4$S) on the nanocatalyst.

While increasing thiophene exposure, χ, in the set of TDS data four features become evident (labeled as A through D). Since the parent mass was detected in these experiments, the molecular adsorption/desorption pathway is being characterized in this experiment. The low temperature edges of the D peak, which is only detectable at the largest exposures, are lining up. In addition, this peak shifts to larger temperatures with increasing thiophene exposure. Both results are a clear indication of the condensation peak and 0$^{th}$-order kinetics. The A, B, and C peaks are a unique fingerprint feature of the nanotubes-derived reaction. Note that for a planar silica support only two peaks, the A and D peaks are evident in the TDS data. In addition, for IF-WS$_2$ nanoparticles also only two TDS structures have been seen. On the other hand, for carbon nanotubes the TDS spectra are similar to those seen here. Therefore, we assign the A, B, and C peaks to adsorption of thiophene on internal, external, and groove sites of the INT-WS$_2$ bundles. INT-WS$_2$ agglomerate on the silica support forming groove sites. Interstitial sites would be too small for encapsulating thiophene. The size of thiophene (0.5 nm) is, however, indeed small enough to be encapsulated by the INTs interior which has a diameter of ~5 nm (see FIG. 1c). Applying a Redhead analysis and assuming a standard pre-exponential factor of 1×10$^{13}$/sec for 1$^{st}$-order kinetics, we obtain (low exposure/coverage) binding energies of 74 kJ/mol (for TDS peak at 11° C.), 52 kJ/mol (−71° C.), and 39 kJ/mol (−120° C.) for the A, B, and C adsorption sites, respectively. Similar TDS experiments were conducted before on non-coated INT-WS$_2$. Very similar TDS data were seen, i.e., it appears that the 10% Co coatings does not affect the molecular binding energies of thiophene significantly.

Multi-mass TDS revealed deviations from the fragmentation pattern expected for gaseous thiophene. This indicates a bond activation of thiophene by the catalyst. However, due to overlapping fragmentation patterns of possibly formed hydrocarbons an identification would be challenging. Therefore, kinetics experiments with a GC were conducted. Note that on the non-coated INT-WS$_2$ the multi-mass TDS data did match perfectly the fragmentation pattern of gaseous thiophene. Therefore, thiophene adsorbs just molecularly on the pristine INT-WS$_2$, but decomposed already at UHV on the cobalt coated WS$_2$ nanotubes. We did not detect adsorption/desorption of H$_2$ or H on the INT at UHV.

Example 4

Photocatylytic Degradation of Methyl Orange by WS$_2$/Co-NP Hybrid of the Invention Azo dies are widely used in the textile industry. As a consequence of this use, the environment problems arise from the release of harmful products. Effluent streams that come from textile plants contain toxic or carcinogenic dye residues and their by-products. Among these dyes, methyl orange (C$_{14}$H$_{14}$N$_3$NaO$_3$S) is a simple azo dye that has been used in textiles, foodstuffs, paper, and leather industries. The release of methyl orange (MO) and its products to the environment can cause serious pollution problems. For that reason effective effluent decolorization process is usually required by environmental regulations.

Figures 8A, 8B, 8C, 8D:
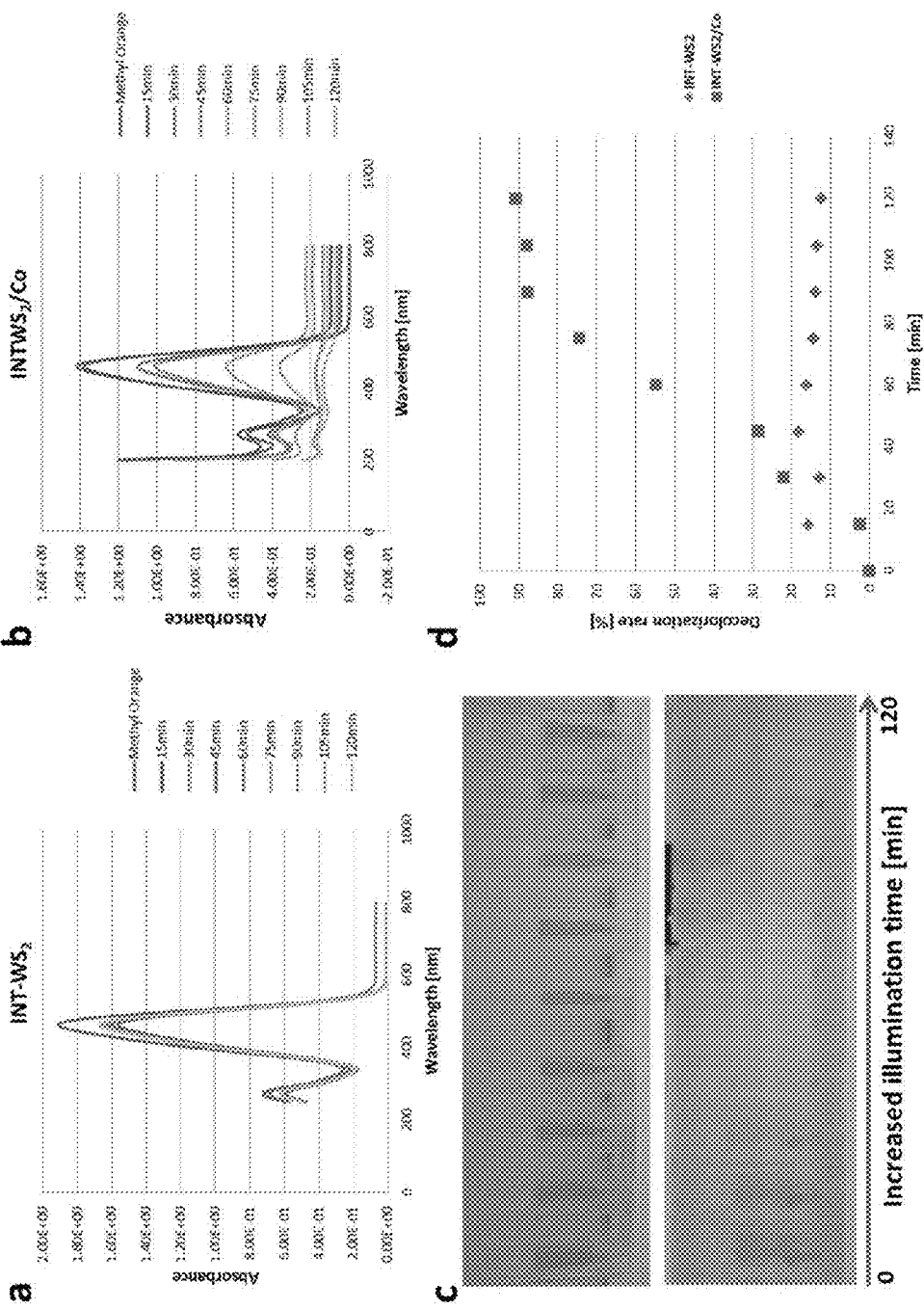
FIGS. 8a-8d show UV-Vis spectra of degradation of methyl orange by (FIG. 8a) pristine $INT-WS_2$ (FIG. 8b) cobalt coated $INT-WS_2$ (FIG. 8c) pictures of MO aqueous solution after different period of time (FIG. 8d) decolorization rate of methyl orange, calculated by equation 1, for cobalt coated $INT-WS_2$ and pristine $INT-WS_2$.

The results show that MO aqueous solution can be decomposed by inorganic coated and uncoated nanotubes under visible illumination. FIG. 8 depicts the UV-Vis spectra of degradation of MO solution by pristine INT-WS$_2$ (FIG. 8a) and cobalt coated INT-WS$_2$ (FIG. 8b). After 120 min of photocatalytic reaction the MO undergoes almost complete degradation by using cobalt coated nanotubes. The decomposition of MO solution could be followed qualitatively also by the bare eye after various periods of times by the change of the solution color (FIG. 8c), whereas MO absorbance changed insignificantly by using uncoated nanowbes. The absorbance of pure MO solution at λmax of 462 nm was measured by a UV-visible spectrophotometer. The decrease in absorbance value of MO solution at $\lambda_{max}$ after illumination in a certain time intervals will be shown as the rate of decolorization. The decolorization rate of MO solution can be expressed and was evaluated according to equation 2:

$$\text{decolorization rate } \% = \frac{A_0 - A_t}{A_0} \quad (2)$$

Where, $A_0$ is the initial absorbance and $A_t$ is the absorbance of sample in time t, t is illumination time of the solution. FIG.

8d shows that cobalt coated nanotubes decompose methyl orange up to almost 90% compared with only 15% of pristine nanotubes.

Figures 9A, 9B, 9C, 9D:
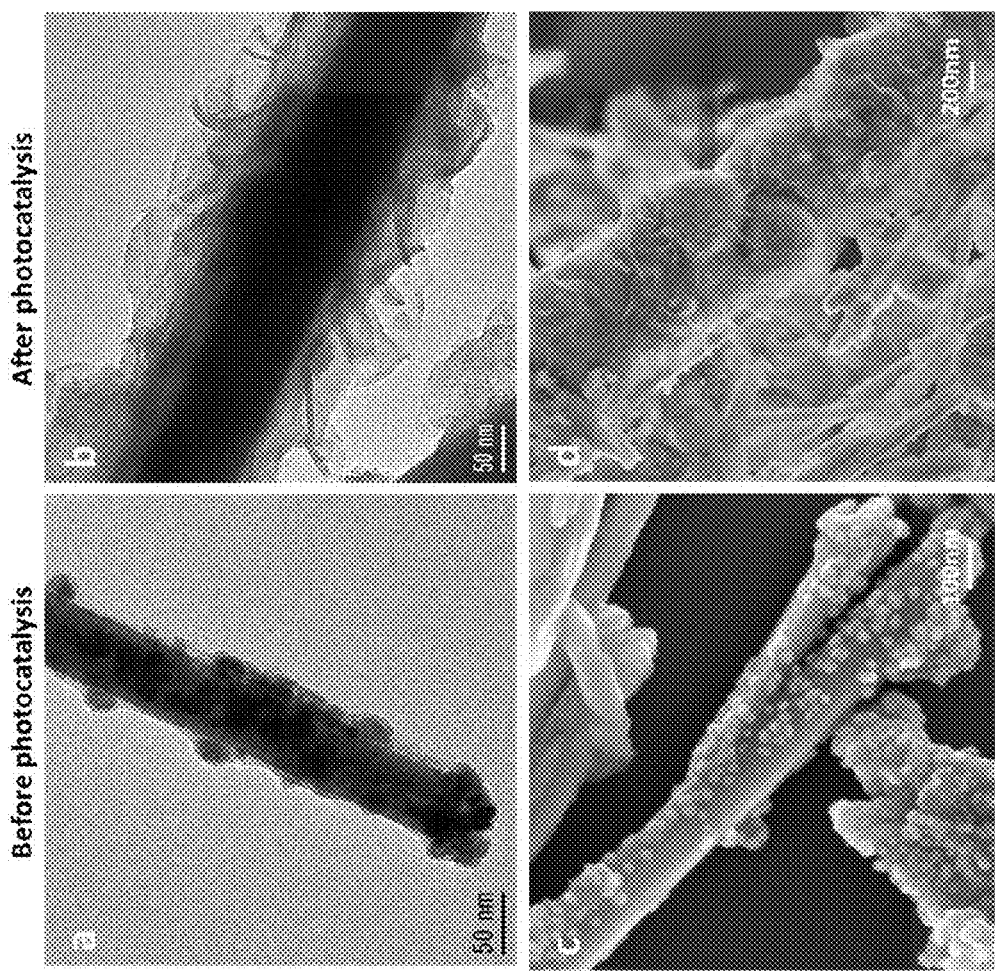
FIGS. 9a-9d show TEM micrographs of cobalt coated $WS_2$ nanotube (FIG. 9a) before and (FIG. 9b) after photocatalytic process; SEM images of cobalt coated $WS_2$ nanotube (FIG. 9c) before and (FIG. 9d) after photocatalytic process.

FIG. 9 presents that the process of degradation of methyl orange in aqueous solution involves some modifications in cobalt coating on the surface of the nanotube. It can be seen that the cobalt nanoparticles (FIG. 9a and FIG. 9c) before photocatalytic reaction were coated only by thin oxide layer. Following the photocatalysis the coating undergoes surface changes (FIG. 9b and FIG. 9d). It was assumed that the fractions of decomposed MO after the photocatalysis were adsorbed to the surface of the coated nanotubes, causing the changes in the cobalt coating. But no peaks of amorphous carbon or any functional groups belonging to MO were observed. Thus it can be assumed that the coating was not influenced by MO and is playing some role in the process of the degradation of methyl orange.

Figure 10A:
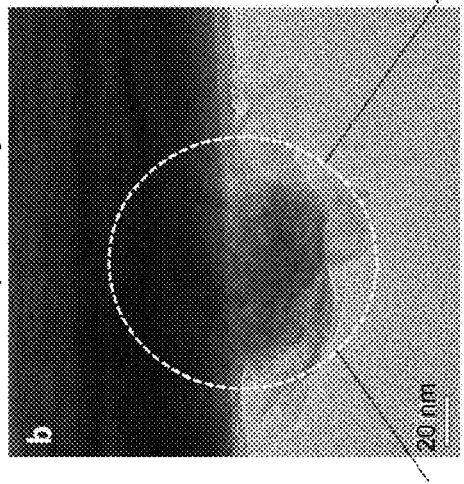
FIGS. 10a-10b show TEM images of cobalt coated nanotube (FIG. 10a) before and (FIG. 10b) after photocatalytic reaction, with EDS on selected areas of the nanotube.
Figure 10B:
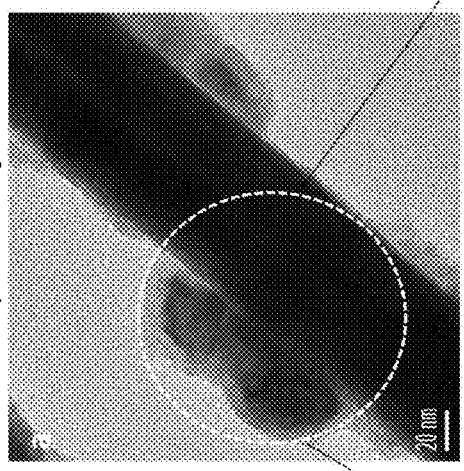

The modifications of the cobalt coating on the surface of the nanotube are characterized by a reduction of the oxygen content in the coating. FIG. 10 shows the cobalt coating before (FIG. 10a) and after (FIG. 10b) photocatalytic reaction. It can be seen that the content of oxygen decreases by factor of almost 2. The reduction of oxygen was observed and evaluated by EDS for several cobalt coated nanotubes for statistic reasons. Probably the thin cobalt oxide layer, that covered the cobalt nanoparticles, decomposes by release of oxygen.

Without wishing to be bound by theory, the significant enhancement in photoactivity can be attributed to the combination of cobalt nanoparticles and $WS_2$ nanotubes. It has been reported that detects or/and metal nanoparticles on the surface of the semiconductor can act as electrons traps. Thus, leading to the efficient separation of photogenerated carriers system and enhance of photocatalytic activity (T. Chen et al. *Journal of the American Society for Mass Spectrometry* 2008, 19, 997-1003; and Wood et al. *The Journal of Physical Chemistry B* 2001, 105, 8810-8815). The photocal process involve excitation of the electron from the valance band to the conduction band of the $WS_2$ nanotube, and generation of electron ($e^-$)/hole ($h^+$) pair. The plausible photocatalytic mechanism can be presented by the following reactions:

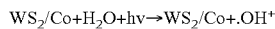

$WS_2/Co+H_2O+h\nu \rightarrow WS_2/Co+.OH^+$

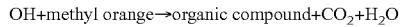

$OH+methyl\ orange \rightarrow organic\ compound+CO_2+H_2O$

The excited electron is transferred to the cobalt nanoparticles. The cobalt core may act as a trap for the conduction electrons. It is also possible that the thin outer layer of the cobalt oxide undergoes reduction, thus acting as an electron trap. This is plausible IP due to the high reduction potential of Co(III) to Co(II) ($E_0=+1.81$ V). Furthermore, this may account for the oxygen content decrease in the coating layer shown in FIG. 10. It will be interesting to study whereas oxygen content will continue to decrease with second use of the catalyst. This thesis will be investigated in the future. In conclusion, the increase of electron/hole pair separation and lifetime, enhance the photocatalytic activity by increasing the generation of superoxide anion radical and hydroxyl radical species.

Figures 11A, 11B, 11C, 11D:
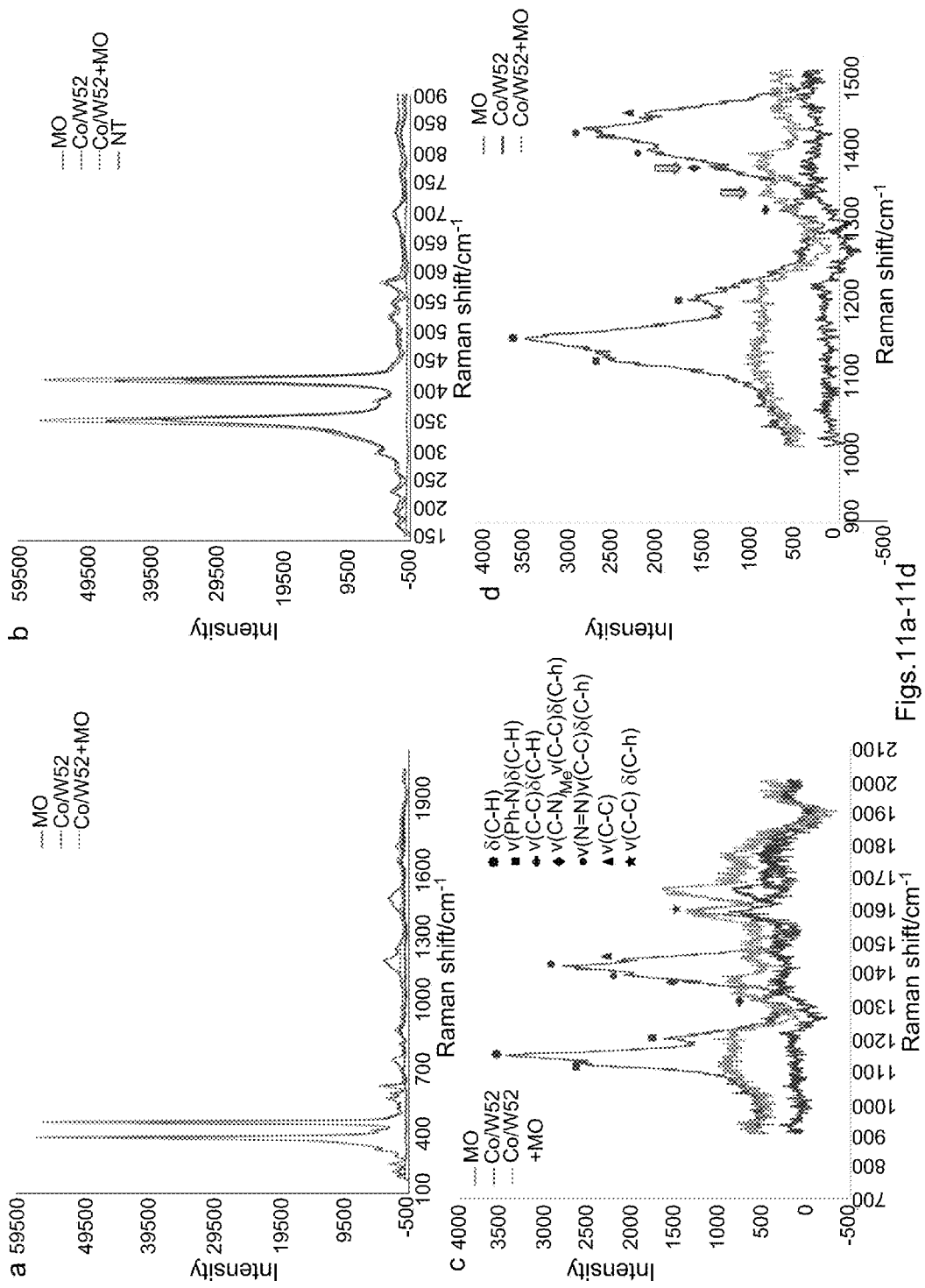
FIGS. 11a-11d provides Raman spectra of (FIG. 11a) MO with dominant peaks identification (FIG. 11b) comparison of coated nanotubes before and after photocatalysis with pristin $INT-WS_2$ (FIG. 11c) MO and cobalt coated $INT-WS_2$ before (shifted for clarity) and after photocatalytic reaction (FIG.

Raman spectroscopy technique (FIG. 11) was used to verify that methyl orange was decomposed by cobalt coated nanotubes, and not adsorbed in large amounts on the surface. The Raman spectrum of pure MO powder is shown in the FIG. 11a. The dominant assignment of MO were identified and found consistent with the literature. Due to characteristic fluorescence of MO powder (not shown) the laser power was reduced and the total spectrum was collected from repeated exposures. FIG. 11b represents comparison of Raman spectra of cobalt coated nanotubes before and after the photocatalytic reaction with pristine INT-$WS_2$. All the peaks of the cobalt coated INT-$WS_2$ before and after the photocatalytic reaction were found to be identical to the Raman spectra of the pristine INT-$WS_2$. In addition the cobalt oxide peaks were not observed in the Raman spectra. It is possible that the Raman signal of the thin cobalt oxide layer could not be detected due to the cross section of the $WS_2$ nanotubes.

To clarify that MO was decomposed by cobalt coated nanotubes and not adsorbed on nanotube's surface the Raman spectra of pure MO powder and cobalt coated INT-$WS_2$ before and after the photocatalytic reaction was compared (FIG. 11c). No peaks that are belonging to MO were found in this range. The dominant assignment of MO (FIG. 11a) belonging to functional groups like —N═N—, benzene ring and —C—N— were not detected on cobalt coated nanotubes after photocatalysis (FIG. 11d). In addition no traces of amorphous carbon were detected on the cobalt coated nanotubes after the photocatalysis. Also no large amounts of MO were adsorbed to the coating surface, since the characteristic MO fluorescence was not observed. The methyl orange decomposed without leaving any traces of residuals on the surface of coated nanotubes, in the limit of the detection.

Raman spectra of pure MO powder and cobalt coated INT-$WS_2$ before and after the photocatalytic reaction was compared clarifying that MO was decomposed by cobalt coated nanotubes and not adsorbed on nanotube's surface. No peaks of MO were found in this range. The dominant assignment of MO of the functional groups like —N═N—, benzene ring and —C—N— were not detected on cobalt coated nanotubes after photocatalysis. In addition no traces of amorphous carbon were detected on the cobalt coated nanotubes after the photocatalysis. Also no large amounts of MO were adsorbed to the coating surface, since the characteristic MO fluorescence was not observed. The methyl orange decomposed without leaving any traces of residuals on the surface of coated nanotubes, in the limit of the detection.

Thus, the cobalt coated nanotubes degrade methyl orange almost to 90% compared with only 15% of pristine nanotubes. Probably cobalt coating acts as traps for conduction electrons, thus enhancing the photoactivity of the hybrid material. Decolorization of MO solution was produced by degradation rather by adsorption of MO onto the surface of coated nanotubes.

The invention claimed is:

1. A hybrid comprising at least one inorganic layered compound in the form of fullerene-like structure or a nanotube and at least one metal nanoparticle, wherein said hybrid is a photocatalyst.

2. A hybrid according to claim 1, wherein said at least one inorganic layered compound is a compound of formula (I):

$M_pX_n$      (I)

wherein
M is a metal selected from the group consisting of transition metals, post-transition metals, lanthanoid metals and actinoid metals;
X is selected from the group consisting of S, Se, and Te;
p is 1 or 2; and
n is 1, 2, 3, 4 or 5.

3. A hybrid according to claim 2, wherein M is selected from W, Mo, V, Zr, Hf, Pt, Re, Nb, Ti, Ga, In, Sn, Pb, Ta and Bi.

4. A hybrid according to claim 1, wherein said at least one inorganic layered compound is selected from a group consisting of $WS_2$, $MoS_2$, $WSe_2$, $MoSe_2$, $NbS_2$, $ReS_2$, $TiS_2$, $TaS_2$, $ZrS_2$ and any combination thereof.

5. A hybrid according to claim 1, wherein said at least one inorganic layered compound is in the form of a nanotube.

6. A hybrid according to claim 1, wherein said at least one metal nanoparticle is selected from the group consisting of Ni, Co, Fe, Ti, Cu, V, Mn, Cr, Au, Pt, Pd, Ru, Rh, Ir, Ag, Os and any combination thereof and oxides thereof.

7. A hybrid according to claim 1, wherein said at least one metal nanoparticle is deposited on the surface of said at least one inorganic layered compound.

8. A hybrid according to claim 1, wherein said at least one nanoparticle has a particle size of between about 1 mn to about 100 nm.

9. A hybrid according to claim 1, wherein said inorganic layered compound and nanoparticle have a diameter in the range of between about 20 nm to about 200 nm.

10. A hybrid according to claim 1, comprising $WS_2$ nanostructure and at least one metal nanoparticle.

11. A hybrid according to claim 1, comprising at least one inorganic fullerene-like nanoparticle and at least one metal nanoparticle.

12. A hybrid according to claim 1, for use as a catalytic agent.

13. A process for the preparation of a hybrid comprising at least one inorganic layered compound or fullerene-like nanoparticle and at least one metal nanoparticle, said process comprising:

providing at least one inorganic layered compound or fullerene-like nanoparticle;

electroless plating at least a portion of the surface of said inorganic layered compound or fullerene-like nanoparticle with at least one metal nanoparticle; thereby providing said hybrid.

14. A method of catalyzing an organic decomposition reaction, comprising performing said organic decomposition reaction in the presence of at least one catalytic agent comprising at least one inorganic layered compound in the form of fullerene-like structure or a nanotube and at least one metal nanoparticle.

* * * * *